United States Patent Office 2,789,619
Patented Apr. 23, 1957

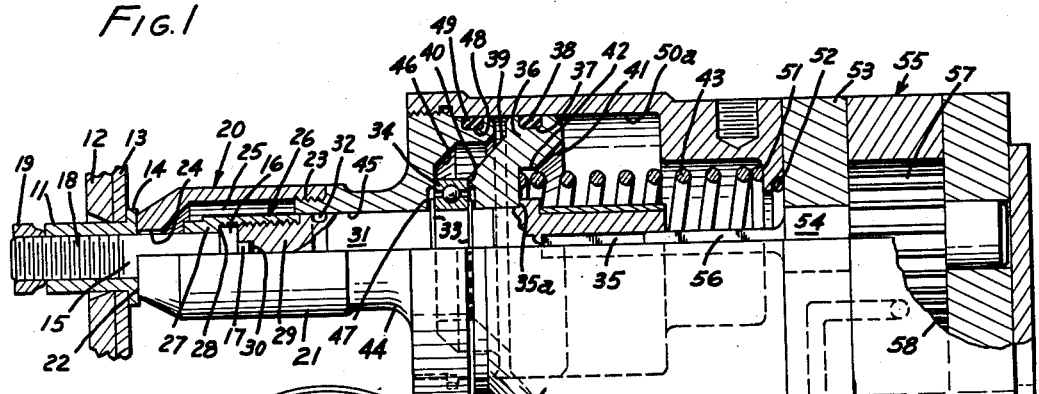
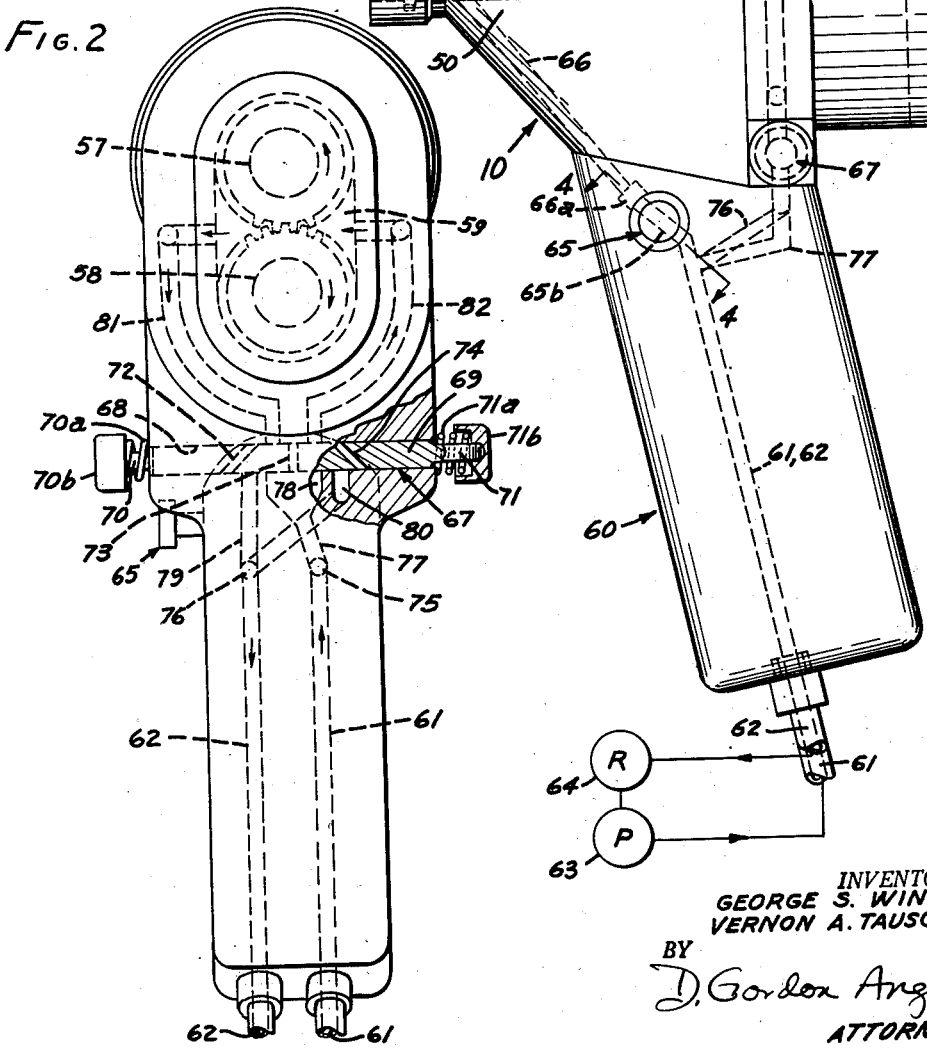

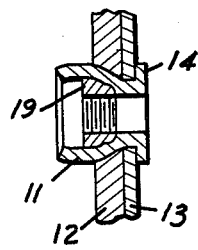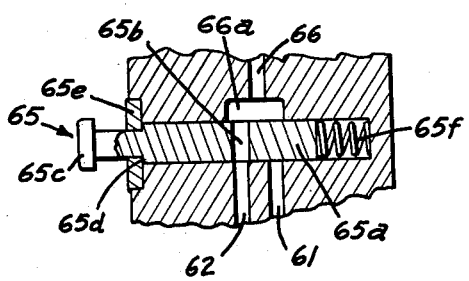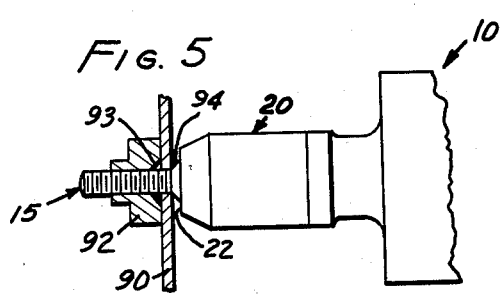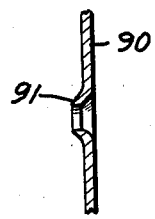

2,789,619

FLUID ACTUATED PULLING AND ROTATING TOOL

George S. Wing, Palos Verdes Estates, and Vernon A. Tauscher, Los Angeles, Calif., assignors, by mesne assignments, to Hi-Shear Rivet Tool Company, Torrance, Calif., a corporation of California Application May 27, 1954, Serial No. 432,726

3 Claims. (Cl. 153—21)

This invention relates to pulling tools and in particular to a puller useful in setting blind rivets, and also in dimpling metal surfaces.

One technique of blind riveting utilizes a blind rivet which comprises a tubular rivet with a head and a shank and an axial hole therethrough. The shank of this rivet is inserted into aligned holes in plates to be joined, so that its end protrudes from the "back" side, and the setting of the rivet is accomplished by expanding the protruding end of the shank.

To provide such shank expansion, expansion means are associated with the rivet before it is inserted into the holes. First, a mandrel stem is thrust through the axial hole so that its end protrudes beyond the end of the shank. Then an expander nut is threaded on to the protruding end of the mandrel. The rivet, nut, and mandrel are then shoved into the aligned holes in the plates which are to be joined by the rivet, so that the nut and the end of the rivet shank are on the opposite side of the plates from the head of the rivet. The rivet is then set by pulling on the mandrel in opposition to the rivet head. This draws the expander nut into the shank to expand its end and thereby clinch the plates together.

The force necessary to expand the end of such a blind rivet which has an appreciable wall thickness of high tensile-strength material is often as high as 10,500 pounds, and it is necessary to provide means which can exert such a high force. It is also desirable to provide some convenient means for removing the mandrel from the nut after the nut has been drawn into the shank of the rivet.

A puller which can perform those functions is also useful in performing a dimpling operation and is therefore a portable and convenient dimpler.

It is an object of this invention to provide a convenient puller for setting tubular rivets of the type described, which is rapid in operation, requires only a negligible effort on the part of the user, and in which the mandrel need not be detached from the puller itself at any time, and which can also be used as a portable dimpler.

The invention is carried out by providing a puller with a body having an internal hydraulic cylinder with a piston which is axially shiftable therein, and also with means for shifting the piston. A mandrel which projects through a wall of the body is attached to the piston and therefore is also shiftable with respect to the body. The body is further provided with means for rotating the mandrel, and the means for rotating the mandrel and the means for shifting the mandrel are separately operable so that a shifting or a rotary motion of the mandrel can occur singly.

By means of such a tool, hydraulic fluid under pressure may be supplied to one side of the piston so as to draw the mandrel toward and partly into the body. When the body of the puller is opposed to the head of the tubular rivet, and the mandrel is inserted in the axial hole with an expander nut attached thereto on the opposite side of the rivet from the puller, such a drawing action will pull the nut into the rivet and set the rivet. After the nut has been drawn into the rivet, the means for rotating the mandrel may be actuated to unthread the mandrel from the nut. The mandrel may thereafter be withdrawn from the rivet shank, leaving the nut therein, and can be prepared for the next setting operation simply by sliding another tubular rivet over the mandrel and threading another expander nut on to the end thereof. This second threading operation can be assisted if desired, by providing means for rotating the mandrel in a direction which is the reverse of that required to unthread the expander nut.

When used as a dimpler, the mandrel is simply passed through a hole in the plate to be dimpled, a female die threaded onto the mandrel by use of the rotary means, and the mandrel shifted so as to force the nose piece of the puller against the metal, and cause the metal to dimple in the female die. Then the rotary means can be reversed, and the die unthreaded and released.

The above and other features of the invention will be fully understood from the following detailed description and the accompanying drawings of which:

Fig. 1 is a side elevation, partly in cross-section, of a puller according to the invention in connection with a blind rivet about to be set;

Fig. 2 is an end view, partly in cross section, of the puller of Fig. 1;

Fig. 3 shows the blind rivet of Fig. 1 fully set after the puller has been operated;

Fig. 4 is a detailed fragmentary cross-section taken at line 4—4 of Fig. 1;

Fig. 5 is a fragmentary side view, partly in cross-section, showing the tool of Fig. 1 in use as a dimpler; and Fig. 6 shows a dimpled sheet after operation of the tool shown in Fig. 5.

In Fig. 1 there is shown a puller 10 in a position ready to set a tubular rivet 11 in plates 12, 13 which are to be joined together. This rivet is shown as having a flat head 14, although it will be understood that this puller may also be used to set rivets of any other desired head shape. A mandrel 15 having a head 16, with a projecting lug 17 at one end and threads 18 at its other end, is inserted through the axial hole in the tubular rivet, so that the threaded end of the mandrel projects beyond the shank of the rivet. Before the rivet assembly is inserted in the holes an expander nut 19 is threaded on the end of the mandrel. It will be observed that the expander nut and the tubular rivet are both of lesser diameter than the holes in the plates, so that the rivet assembly can be passed therethrough until the head bears against plate 13.

The puller 10 comprises a body 20 having a bucking portion 21 which is narrowed down and flattened at one end so as to make an annular bucking section 22 of approximately the same dimensions and conformation as the head of the rivet to be set. The interior part of the bucking portion has internal threads 23 at the end away from the annular bucking section 22.

Adjacent the annular bucking section 22 there is a bore 24 through which the mandrel 15 projects. Further away from the annular bucking section 22, the interior expands to form a cylinder 25 of intermediate size within which a chuck assembly 26 can both rotate and shift. This chuck assembly has a retainer which comprises a sleeve 27, with an inwardly projecting shoulder 28. The sleeve 27 is internally threaded at the end away from the shoulder 28, and is threaded to a boss 29. A slot 30, adapted to receive the lug 17 of the mandrel is formed in the end of the boss.

The boss forms an integral part of a generally cylindrical rod 31 which extends away from the mandrel coaxially therewith and into the body 20. The rod has a ring groove 32 adjacent to the boss. Two retainer rings 33 are provided for holding a thrust bearing 34 in place around the rod. The end of the rod away from the mandrel has a flat central slot 35 therein which is centered axially with respect to the mandrel. A shoulder 35a extends around the rod near the slotted end.

A piston 36 is provided with a peripheral ring groove 37 within which there is fitted a resilient O ring 38. The piston surrounds the rod 31 and is freely rotatable, but axially restrained with respect to it. Therefore the rod and piston will shift axially together with respect to the body, but each is free to rotate with respect to the other. The piston has a frusto-conical face 39 on its side nearest the mandrel, said face having a raised annular boss 40 which can make contact with the outer race of the thrust bearing 34, while holding the rest of the piston away from contact with either the retainer rings or the inner bearing race. The other face of the piston has a tapered portion 41, and a cylindrical bore 42 which serves as a seat for a coil spring 43, said coil spring surrounding the slotted end of the rod.

An intermediate body section 44 is threaded to the bucking portion, and has external threads which mate with threads 23 to join the two. This intermediate body section has a central cylindrical bore 45 to pass the rod, and an expanded portion with a countersink 46. At the center of the countersink there is another sink 47 to accommodate a retaining ring, and to permit the outer race of the thrust bearing to press directly against the intermediate body section at one extreme of the rod's movement as shown in Fig. 1.

The outside of the expanded portion is threaded, and has a groove 48 to hold a compressible O ring 49. To this intermediate body section there is joined a cylinder body section 50 which has a smooth bore 50a therein to serve as a hydraulic cylinder in which the piston is shiftable. It will be appreciated that a hydraulic expansion chamber is formed within the bore 50a and between the intermediate body section 44 and the piston face 39, the piston thereby bounding the chamber within the cylinder. The cylinder body section is reduced in its internal diameter at the end opposite the mandrel to form a shoulder 51 which opposes the coil spring 43. At the outer end there is provided a seat for a compressible sealing ring 52 which is disposed between a valve plate 53 and the cylinder body section. The power shaft 54 of a hydraulic gear-type motor 55 is journaled in the valve plate, and has a flat tongue 56 which fits into the slotted end of the rod 31. Therefore the rod 31 and the power shaft 54 are constrained to mutual rotation but are axially shiftable with respect to one another.

The gear motor is a conventional type and comprises two meshing rotary gears 57, 58 within a motor chamber 59 which closely fits the outer edges of the gear teeth. The hydraulic motor, valve plate, and puller body can be held together by any appropriate means. The cylinder body section 20 is conveniently provided with a hand grip 60.

The hydraulic actuating system will now be described. A pressure conduit 61 and an exhaust conduit 62 are provided in the hand grip, and have connections at the bottom of the grip to a pump 63 and a reservoir 64 respectively. The pump and reservoir are interconnected to complete the hydraulic circuit.

A slide valve 65 (see Fig. 4) has a slide member 65a with a passage 65b therethrough. The end of the slide member projecting from the body of the puller is formed as a button 65c. The slide member is provided with a shoulder 65d which is restrained by an insert 65e to prevent the member's being ejected by the spring 65f. The slide member is therefore spring loaded so that its normal position is as shown, with the passage 65b in communication with exhaust conduit 62. The button can be pushed so as to move the slide member against the spring and put the passage 65b in communication with pressure conduit 61.

A conduit 66 leads from an elongated chamber 66a (which is always in communication with passage 65b regardless of its position) to the hydraulic expansion chamber.

Flow of fluid to the hydraulic motor is controlled by a selector valve 67 disposed in the valve plate. The selector valve comprises a transverse slot 68 formed in the valve plate which holds a slide member 69. The slide member is conveniently provided with a pair of projecting studs 70, 71, one stud being disposed on each end for sliding the member 69 in the slot. The slide member has three drilled conduits, left hand conduit 72, middle conduit 73 and right hand conduit 74 as shown in Fig. 2. The slide member is centered at an off position as shown by providing springs 70a, 71a under caps 70b, 71b threaded to the end of studs 70, 71 respectively. The springs bear against the side of the puller and the underside of the caps.

Conduits 75 and 76 in the grip tap the pressure and exhaust conduits respectively. Pressure conduit 75 connects with a rising conduit 77 in the valve plate which has an enlarged chamber 78 adjoining the slide member. Exhaust conduit 76 branches to form two conduits 79, 80 adjoining the slide member on opposite sides of the chamber 78.

Motor conduits 81, 82 adjoin the slide member on the side opposite the above described conduits. Conduit 81 leads to the left hand side of the gear motor, and conduit 82 leads to the right hand side of the motor, as shown in Fig. 2.

Fig. 5 shows the puller 10 adapted to act as a dimpler, to dimple a plate 90. Fig. 6 shows the resulting dimpled section 91. The mandrel 15 is inserted in a hole in plate 90 to be dimpled, and a female die 92 having a frusto conical forming surface 93, is threaded onto the mandrel on the opposite side of the plate from the puller. The bucking section 22 has a male die 94 on its surface adjacent the mandrel with a surface which generally matches the female forming surface 93.

The operation of the puller to set a blind rivet will now be described. The slide valve 65 is normally positioned so that passage 65b is in connection with the exhaust conduit 62. This permits any fluid in the expansion chamber to drain to exhaust conduit 62 and the reservoir 64 and permits the spring 43 to shove the piston all the way to the left as shown in Fig. 1. This causes the boss 40 to bear against the outer race of the thrust bearing 34 and the chuck extends the mandrel as far as possible out of the body.

At this time, a tubular rivet is placed over the mandrel, with the head of the rivet next to the angular bucking section 22. The selector valve is then moved to the left, by pressing cap 71 away from the position shown in Fig. 2. At that position the right hand conduit 74 will interconnect conduits 82 and 80 and conduit 73 will interconnect conduit 81 and chamber 78. This will cause fluid under pressure to proceed through conduit 81 to the left hand side of the gear motor, whereupon it will proceed around the outside of the gears, next to the walls of the motor chamber, so as to rotate the upper gear 57 in a clockwise direction. This rotation enables an expander nut 19 to be threaded on to the mandrel with little effort on the part of the operator.

After the expander nut has been properly threaded, the selector member 69 is centered by releasing cap 71, and assumes an intermediate position so that neither of conduits 73 and 74 form part of a continuous conduit. The motor therefore stops its rotation. The assembled rivet and mandrel are passed into the aligned holes in the plate to be joined as in Fig. 1, and the slide valve 65 moved by pushing button 65c. At this position passage 65b interconnects the pressure conduit 61 with the conduit 66 and therefore furnishes fluid under pressure to the hydraulic expansion chamber. This forces the piston to the right and pulls the mandrel toward and partly into the body, and also pulls the expander nut 19 into the shank of the rivet 11. This action is accompanied by pressure of the annular bucking section 22 against the head 14 of the rivet to hold the rivet firmly against the plates.

When the nut has been drawn sufficiently far into the rivet, the button 65c is released and passage 65b makes a fluid connection between the conduit 66 and the exhaust conduit 62. This permits the fluid in the expansion chamber to flow back to the reservoir. This exhaust is aided by the force of the coil spring 43.

The mandrel is then unthreaded from the expander nut by pushing cap 70 so as to move conduit 72 into communication with conduit 81, and conduit 73 into communication between conduits 78 and 82. Therefore the pressurized flow enters through conduit 82 and rotates the gear 57 in a counterclockwise fashion so as to unthread the mandrel from the expander nut, leaving the expander nut in the rivet. The rotation of the gear motor will be stopped by releasing cap 70 so that slide member 69 shifts to the intermediate position described above. The resulting blind rivet is shown in Fig. 3.

It will be appreciated that by providing the flat tongue 56 on the end of the shaft 54 of gear 57, the rod 31 and shaft 54 are rotatably constrained to each other, but are axially shiftable relative to each other. By restraining the piston between the outer race of the thrust bearing 34 and the shoulder 35a of the rod, the piston is constrained to shift axially with the piston, but is free to rotate independently of the piston.

It will be appreciated that mandrels of different sizes and diameters can be utilized with this puller simply by changing the size of the chuck on the end of the puller. The forces developed for pulling may be adjusted by varying the pressure of the hydraulic fluid.

The operation of the puller as a portable dimpler will now be described. The mandrel 15 is inserted into the hole, and the cap 71 is pressed so as to turn the mandrel and thread the female die 92 onto the mandrel. Then cap 71 is released, the valve centers itself and the rotation ceases. The button 65c is then pressed, and the mandrel is pulled toward the tool. This moves the male and female dies toward each other and forms the dimple 91. Button 65c is then released, and the mandrel moves out of the tool. Cap 70 is next pressed, and the female die unthreaded so the mandrel can be withdrawn from the dimpled hole.

This puller therefore provides a convenient puller suitable for production line operations which can set blind rivets of the type described, or perform any other similar pulling operation such as dimpling. It is particularly useful when a separate rotary motion of the mandrel is desired, and this separate rotary and axial movement of the mandrel permits a wide range of applications.

This tool is particularly desirable inasmuch as it is portable, and can be applied in any desired position. Therefore a convenient means is provided for dimpling holes in positions inaccessible to conventional dimplers.

Other uses of this tool, and certain modifications of the structure will be perceived by persons skilled in the art. Therefore this invention is not to be limited by the embodiments shown in the drawings and described in the description, which are given by way of example, and not of limitation, but only in accordance with the scope of the appended claims. Nor is the invention to be limited to use with any particular type of rivet or other fastening device.

We claim:

1. A puller comprising: a body having a hydraulic cylinder with a central axis; a rotatable and axially shiftable member in the cylinder, said member having a central slot extending thereinto from one end thereof; a piston within the hydraulic cylinder making a sliding and fluid sealing fit with said cylinder, said piston being attached to the member so as to move axially therewith, while the member and piston are rotatable relative to each other, said piston also bounding a hydraulic expansion chamber in the cylinder; means for introducing pressurized fluid into said chamber for shifting the piston and member; a fluid driven gear motor for rotating the member; a shaft connected to and driven by said gear motor having a tongue which projects into the slot in the member, whereby rotation of the gear motor turns the member, while the tongue and slot permit axial movement of said member independently of the said rotation of the gear motor; means for introducing pressurized fluid into said gear motor; a thrust bearing comprising an inner and outer race, said inner race being fixed to the member, and said outer race contacting the piston; a coil spring between said gear motor and piston for forcing the piston away from the gear motor; and a threaded member extending beyond the body and attached to said member for movement therewith.

2. Apparatus according to claim 1 in which a hand grip is provided on the body, and in which the means for introducing the pressurized fluid into the chamber and into the gear motor comprises conduits leading thereto, and a valve in each of said conduits.

3. Apparatus according to claim 2 in which the member and the cylinder are co-axially disposed.

References Cited in the file of this patent

UNITED STATES PATENTS

| | | |
|---|---|---|
| 2,283,665 | Cadden | May 19, 1942 |
| 2,283,708 | Trautmann | May 19, 1942 |
| 2,423,957 | Amtsberg | July 15, 1947 |
| 2,583,733 | Fischer et al. | Jan. 29, 1952 |